US009694773B2

(12) United States Patent
Cha et al.

(10) Patent No.: US 9,694,773 B2
(45) Date of Patent: Jul. 4, 2017

(54) ROD STIFFENER FOR BUMPER OF CAR

(71) Applicants: Hyundai Motor Company, Seoul (KR); Hanwha Advanced Materials Corporation, Seoul (KR)

(72) Inventors: Dong Eun Cha, Suwon-si (KR); Bock Cheol Lee, Suwon-si (KR); Jung Ho Kim, Seoul (KR); Young Sub Oh, Suwon-si (KR); Phil Jung Jeong, Yongin-si (KR); Seung Mok Lee, Osan-si (KR); Hyun Gyung Kim, Hwaseong-si (KR); Sang Wook Nam, Seoul (KR); Do Hyun Kim, Seoul (KR); Joung Myung Lim, Cheongju-si (KR)

(73) Assignees: HYUNDAI MOTOR COMPANY, Seoul (KR); HANWHA ADVANCED MATERIALS CORPORATION, Seoul (KR)

( * ) Notice: Subject to any disclaimer, the term of this patent is extended or adjusted under 35 U.S.C. 154(b) by 0 days.

(21) Appl. No.: 14/525,499

(22) Filed: Oct. 28, 2014

(65) Prior Publication Data
US 2016/0114746 A1 Apr. 28, 2016

(51) Int. Cl.
*B60R 19/03* (2006.01)
*B60R 19/24* (2006.01)
*B60R 19/18* (2006.01)

(52) U.S. Cl.
CPC ............ *B60R 19/03* (2013.01); *B60R 19/18* (2013.01); *B60R 19/24* (2013.01); *B60R 2019/1853* (2013.01); *B60R 2019/247* (2013.01)

(58) Field of Classification Search
CPC ... B60R 19/03; B60R 2019/247; B60R 19/24; B60R 19/18; B60R 2019/1853
USPC ................................................... 293/120, 102
See application file for complete search history.

(56) References Cited

U.S. PATENT DOCUMENTS

| 6,036,560 A * | 3/2000 | Pekar ..................... B63B 3/34 441/65 |
| 6,712,657 B1* | 3/2004 | Echecopar .......... B63B 35/7909 114/357 |
| 7,347,754 B1* | 3/2008 | Cheung ............... B63B 35/7906 441/65 |
| 7,938,705 B2* | 5/2011 | Fitzgerald ........... B63B 35/7906 441/74 |
| 7,985,111 B2* | 7/2011 | Gasparro .............. B29C 44/569 441/74 |

(Continued)

FOREIGN PATENT DOCUMENTS

BE  EP 2567932 A1 * 3/2013 ............. B60R 19/03
CN  203927104 U  * 11/2014

(Continued)

*Primary Examiner* — Pinel Romain
(74) *Attorney, Agent, or Firm* — Morgan, Lewis & Bockius LLP

(57) ABSTRACT

A rod stiffener may include a rod molded by a glass fiber reinforced thermoplastic resin, and brackets connected to both ends of the rod, in which properties of a core part forming a center of the rod and an outer part surrounding the core part are formed to be different from each other, and the properties of the core part and the outer part are differentiated by a mixing amount of glass fiber and polypropylene resin including the glass fiber reinforced thermoplastic resin.

6 Claims, 7 Drawing Sheets

(56) References Cited

U.S. PATENT DOCUMENTS

| | | | |
|---|---|---|---|
| 8,276,953 | B2 | 10/2012 | Erzgräber et al. |
| 8,317,240 | B2 | 11/2012 | Müller et al. |
| 2014/0284947 | A1* | 9/2014 | Nagaya .................. B60R 19/34 293/133 |
| 2015/0307045 | A1* | 10/2015 | Matecki ................ B60R 19/023 293/122 |
| 2015/0336524 | A1* | 11/2015 | Larner .................... B60R 11/04 293/120 |
| 2016/0001722 | A1* | 1/2016 | Nickel .................... B60R 19/18 293/120 |

FOREIGN PATENT DOCUMENTS

| | | |
|---|---|---|
| JP | 2010-229348 | 10/2010 |
| KR | 10-0814862 | 3/2008 |
| KR | 10-2011-0059170 | 6/2011 |
| KR | 10-1096052 | 12/2011 |
| KR | 10-1198621 | 11/2012 |
| KR | 101475358 B1 * | 12/2014 |

* cited by examiner

ROD STIFFENER FOR BUMPER OF CAR

BACKGROUND OF THE INVENTION

Field of the Invention

The present invention relates to a rod stiffener for a bumper of a car, and more particularly, to a rod stiffener for a bumper of a car which is coupled to a lower portion of a bumper beam of the car to improve shock absorption capability when the car collides and is improved to simultaneously implement stiffness and flexibility as well as weight lightening and cost reduction while maximally guaranteeing safety of passengers.

Description of Related Art

In general, a bumper beam for a car, which is to be elastically deformed when the car collides at a low speed to minimize physical damage to the car, may be a buffer disposed at a front and rear of the car so that it may absorb shock when the car collides with other cars or a fixed body in order to aim for safety of passengers and minimize deformation of a car body at the same time.

In case of increasing strength of the above-mentioned bumper beam, weight and cost are rapidly increased, and in case of decreasing weight and cost, strength is decreased, such that a function thereof may be insufficiently performed.

Therefore, a fiber reinforced thermoplastic resin having increased strength while using weight lightening material, for example, a glass fiber mat thermoplastic (GMT) material has been developed.

Here, the GMT material, which is a composite material having a plate shape consisting of a polypropylene resin, which is a general purpose resin, and a glass fiber mat reinforcement, is a novel material having excellent adhesion with the resin because polypropylene in a melted state extruded through a T-Die, particularly, and glass fiber nonwoven mat are directly clipped, exhibiting excellent strength compared to existing materials used in prior art because strength of glass itself is reinforced by a mat shape, and having characteristics such as light weight property and a degree of freedom of design, which are unique properties of plastic as well as high productivity, recyclability, and the like, based on the thermoplastic resin.

The above-mentioned GMT material is highlighted as a next generation composite material to be used for the bumper beam, a seat back, an undercover, and the like because it may be weight lightened, has excellent absorptiveness of collision energy, has an improved degree of freedom of a design, and has excellent assembly properties, corrosion resistance, stiffness, stability, sound insulation property, dust elimination property, elasticity, shock resistance, and the like.

Meanwhile, in order to satisfy pedestrian regulations for minimizing injury when the car collides with a pedestrian, as shown in FIG. 1, a rod stiffener 200 coupled to a lower portion of a bumper beam 100 is disclosed.

However, since the rod stiffener according to the related art is disclosed only as a part for simply satisfying the pedestrian regulations rather than an optimal design, it increases weight according to an addition thereof and is at a level simply decreasing a degree of bending of a knee angle of the pedestrian, and since a structure and dynamic approach is not performed in view of stiffness and flexibility, it causes weight to be increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rod stiffener for a bumper of a novel concept capable of enabling cost reduction and weight lightening as compared to an existing rod stiffener while simultaneously satisfying stiffness and flexibility and also satisfying pedestrian regulations by varying content of a glass fiber reinforced thermoplastic resin to mix properties.

According to various aspects of the present invention, a rod stiffener may include a rod molded by a glass fiber reinforced thermoplastic resin, and brackets connected to both ends of the rod, in which the glass fiber reinforced thermoplastic resin includes a mixing amount of glass fiber and a mixing amount of polypropylene resin, and properties of a core part forming a center of the rod and an outer part surrounding the core part are formed to be different from each other, and the properties of the core part and the outer part are differentiated by the mixing amount of the glass fiber and the mixing amount of the polypropylene resin.

The outer part may have a relatively higher stiffness than the core part.

The mixing amount of the glass fiber and the mixing amount of the polypropylene resin may be mixed at a weight ratio of 60 to 90:10 to 40 of the glass fiber to the polypropylene resin.

The brackets may be integrally molded on the rod.

The mixing amount of the glass fiber may be at least 60 wt % or more.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
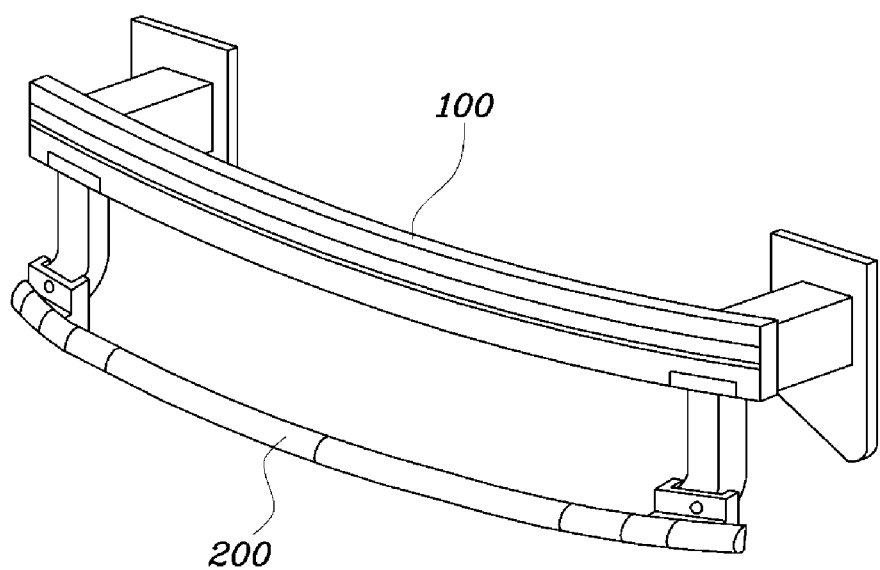
FIG. 1 is an illustrative view illustrating an installing example of a rod stiffener for describing the present invention.
Figure 2A:
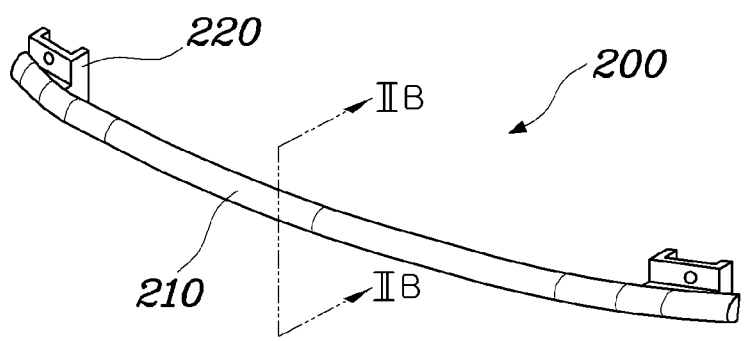
FIG. 2A is an illustrative view illustrating a structure of an exemplary rod stiffener according to the present invention
Figure 2B:
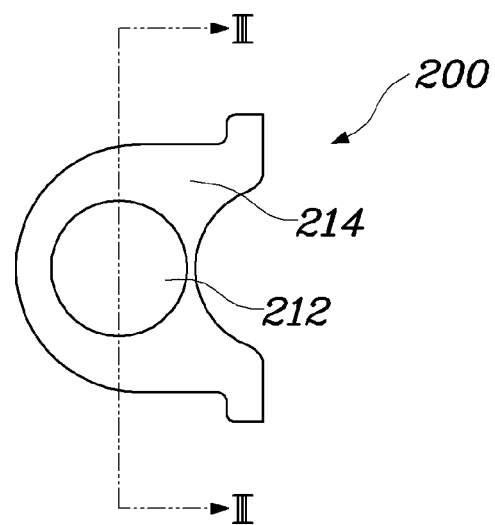
FIG. 2B is a cross-sectional view of the line IIB-IIB as shown in FIG. 2A.
Figure 3:
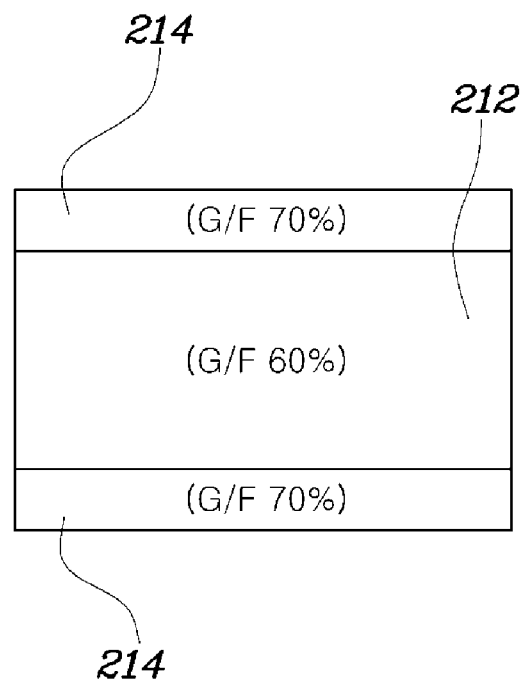
FIG. 3 is a cross-sectional view illustrating a layer structure of the exemplary rod stiffener of the line III-III as shown in FIG. 2B.
Figure 4:
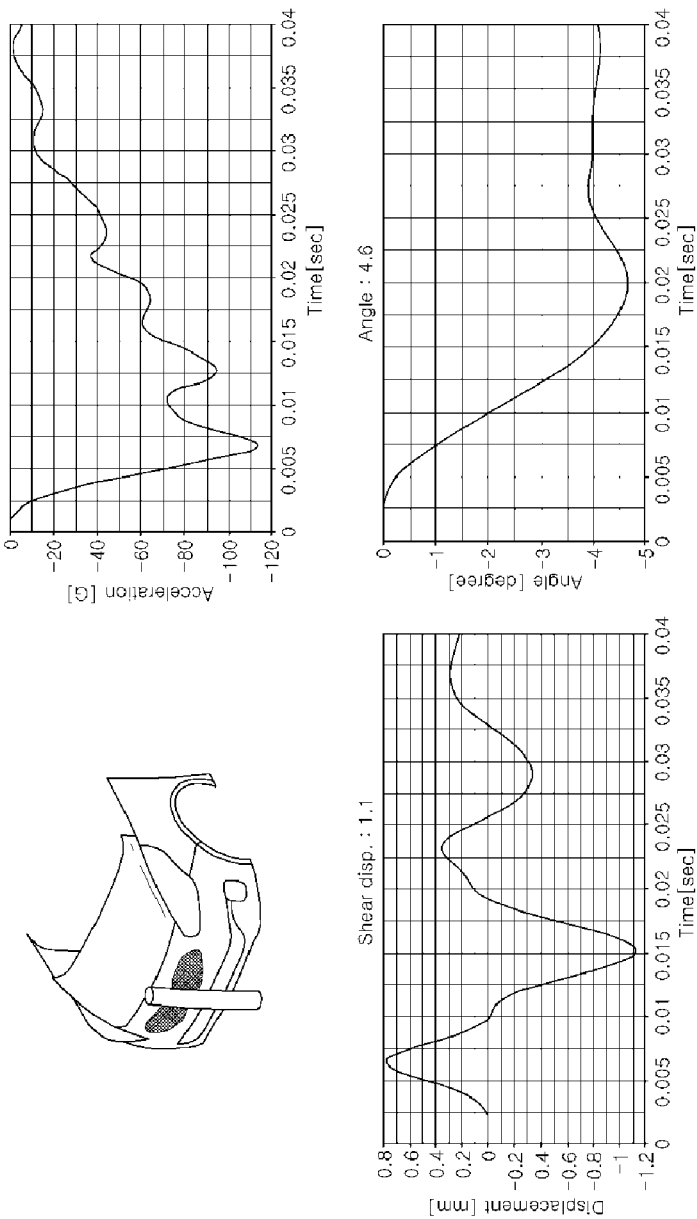
FIG. 4, FIG. 5, FIG. 6 and FIG. 7 are graphs illustrating measured examples of properties of the exemplary rod stiffener according to the present invention.
Figure 4:
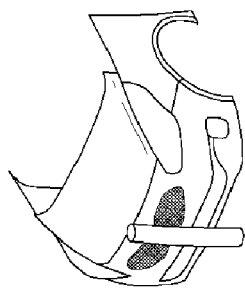
Figure 5:
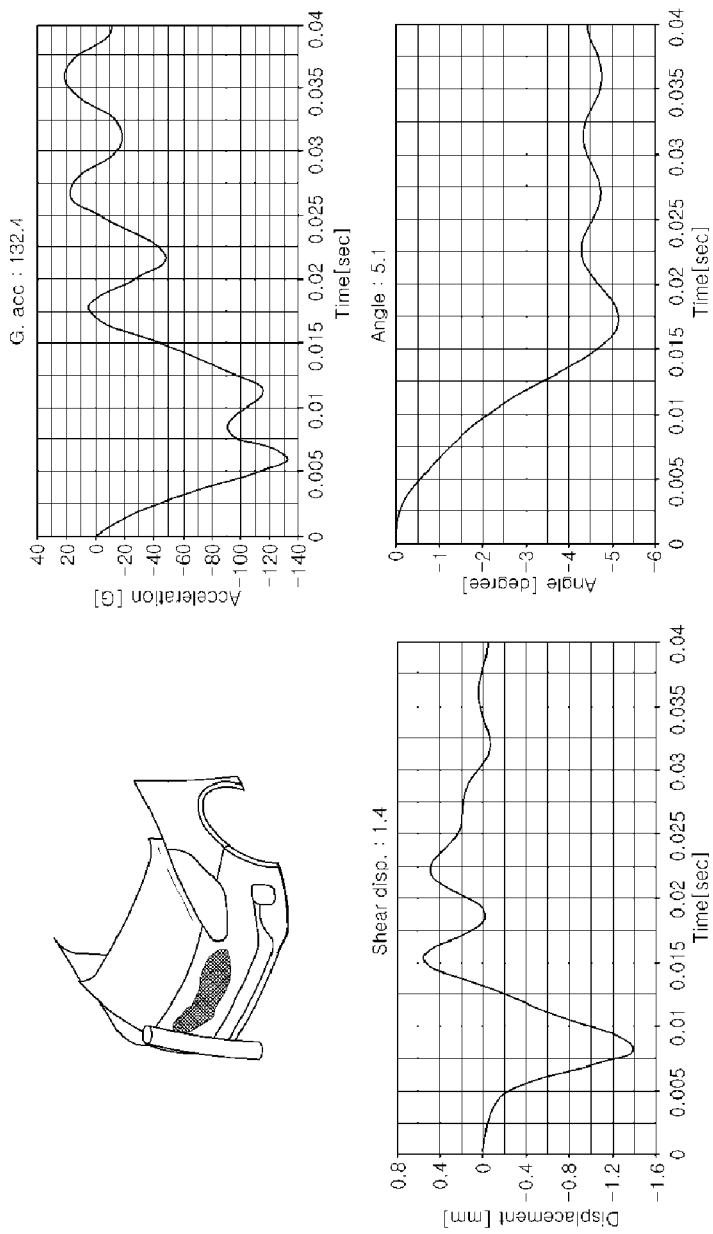
Figure 6:
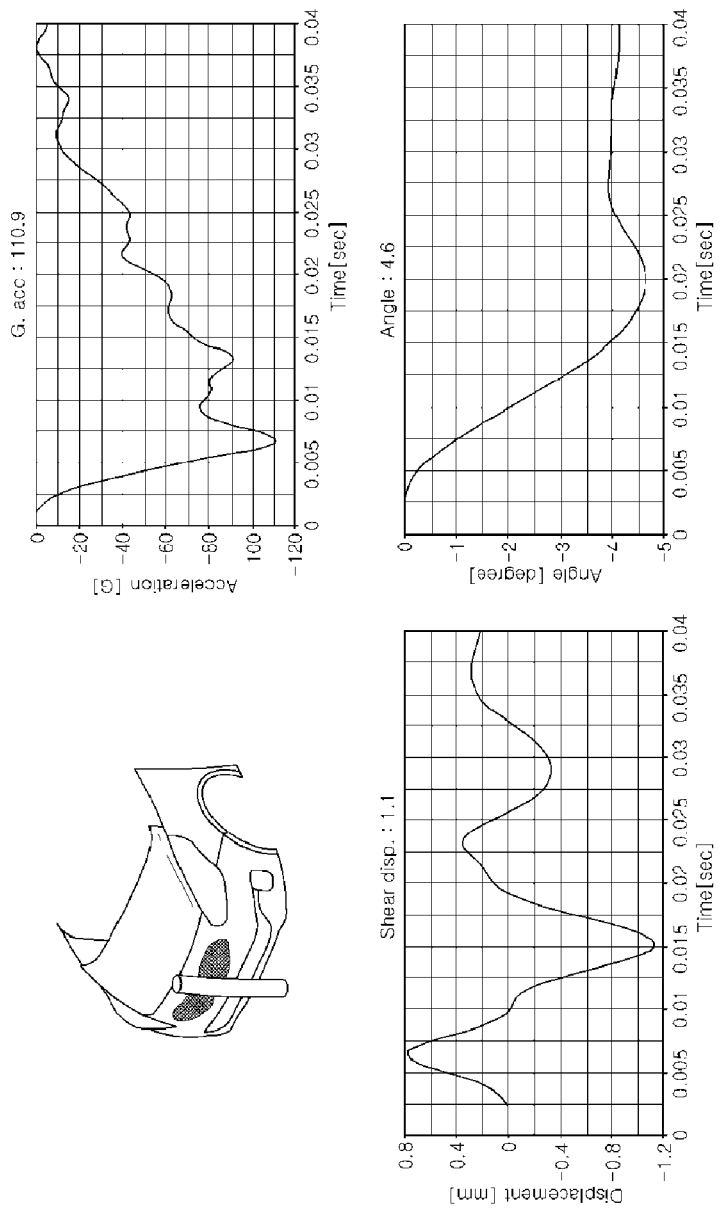
Figure 7:
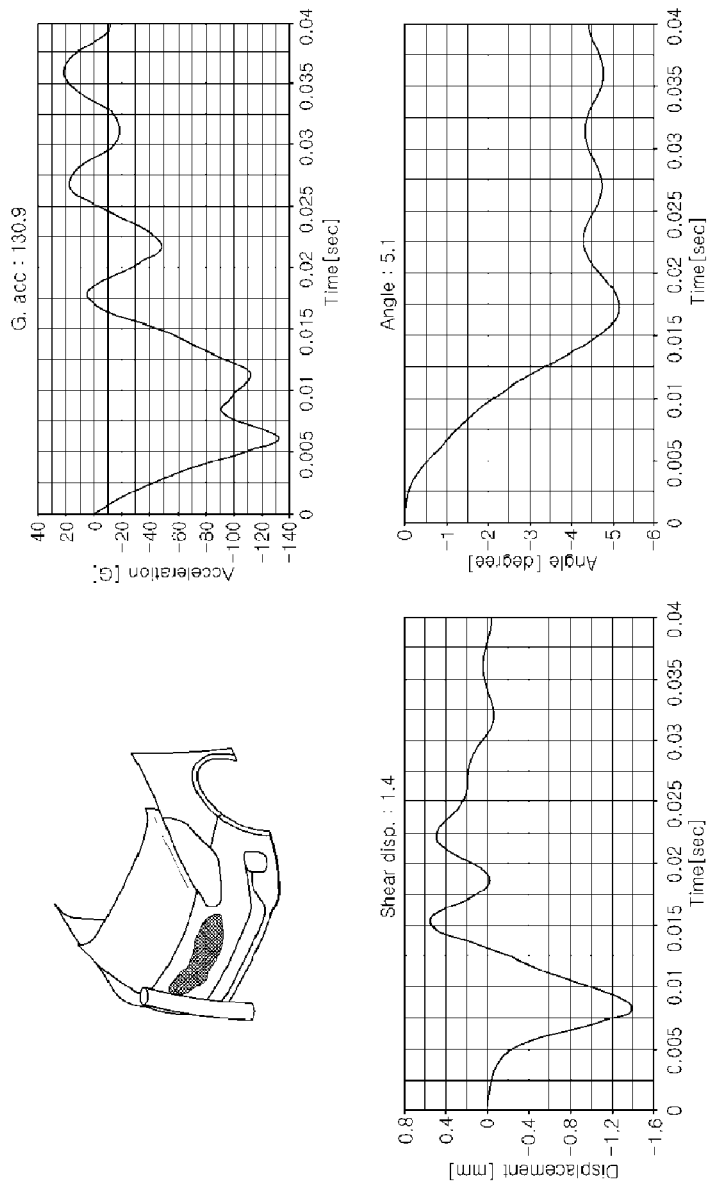

As shown in FIGS. 2A, 2B and 3, a rod stiffener 200 is mounted on a lower portion of a bumper beam, for example bumper beam 100 (see FIG. 1) in order to satisfy a pedestrian standard.

The above-mentioned rod stiffener 200 includes a rod 210 having a fender bar shape which is arranged in a lateral direction while having a predetermined curvature, and brackets 220 integrally formed at both ends of the rod 210.

In this case, since the brackets 220 are integrally molded on the rod 210 unlike the related art, manufacturing processes may be shortened as compared to the related art.

In addition, the rod 210 is formed by a compact body, wherein a core part 212 is provided to a center and an outer part 214 having a form surrounding the core part 212 is provided.

Here, the core part 212 and the outer part 214 may be configured to have different mechanical properties by using the same material but mixing properties of high stiffness and low stiffness, and the core part 212 may be formed to have relatively lower stiffness than the outer part 214.

More specifically, the rod 210 is formed using the glass fiber reinforced thermoplastic resin (GMT) as a main material and may be configured to enable high stiffness and low stiffness to be mixed as described above by varying a mixing ratio of a polypropylene resin which is mixed in glass fiber to manufacture the rod 210.

In this case, in mixing properties of low stiffness of the core part 212 and high stiffness of the outer part 214, when the glass fiber and the polypropylene resin are mixed, as a mixing amount of the polypropylene resin is increased, flexibility is increased to become low stiffness, and as the mixing amount thereof is decreased, stiffness is increased to become high stiffness.

In this case, since the core 212 and the outer part 214 have a relative relationship of property mixing, there is no need to quantitatively determine both parts and the outer part 214 only needs to have relatively stronger properties than the core part 212.

Therefore, each of the core part 212 and the outer part 214 may be mixed within a weight ratio that a mixing ratio of the glass fiber to polypropylene resin is 60 to 90:10 to 40.

Here, the reason for having the mixing ratio of the glass fiber of at least 60 wt % or more is that it is a minimum requirement to reveal basic characteristic of the glass fiber reinforced thermoplastic resin.

Therefore, as shown in the illustration of FIG. 3, in the case in which the core part 212 is a glass fiber (G/F) of 60% in which the glass fiber of 60 wt % and the polypropylene resin of 40 wt % are mixed, the outer part 214 surrounding the core part 212 is formed of G/F of 70% in which the glass fiber of 70 wt % and the polypropylene resin of 30 wt % are mixed, such that the outer part 214 may be formed to have higher stiffness than the core part 212.

By the configuration as described above, weight may be controlled and cost may also be reduced, accordingly.

Additionally, when a car collides with a pedestrian, since the core part 212 is relatively soft, shock absorption amount is increased, such that pedestrian regulations are properly satisfied.

Particularly, since various aspects of the present invention may produce the core part 212 and the outer part 214 by adjusting a difference between properties of the core part 212 and the outer part 214 to be small or large as much as it is desired within a range of the mixing ratio as described above, usefulness is increased as much as the difference.

In order to check whether or not the rod stiffener 200 satisfies the pedestrian regulations, results obtained by measuring a value of force reaching the rod stiffener according to a position at which the pedestrian collides with the bumper beam are illustrated in each of FIGS. 4, 5, 6 and 7.

In this case, BL is an indication indicating a distance which is spaced apart from a length center of the bumper beam (e.g. as illustrated in FIG. 1), that is, a center toward both ends. For example, 0BL means the center and 480BL means a point spaced apart from the center by 480 mm, which is to describe according to the pedestrian standard.

Further, a specification (Spec.), which is required by the regulations, is tibia acceleration of 150G, bending angle of 15 deg, and shear displacement within 5 mm.

In this case, G, which is a unit of the tibia acceleration, means f/kg.

In order to check whether or not the above-mentioned regulations are satisfied, after a rod stiffener in which the core part 212 of G/F of 60% and the outer part 214 of G/F of 70% are mixed, and a rod stiffener in which all of the core part 212 and the outer part 214 have the same G/F of 70% are respectively mounted on the bumper beam, it was checked whether or not the pedestrian regulations are satisfied according to collisions at 0BL and 480BL, and results thereof are illustrated in FIGS. 4, 5, 6 and 7.

The test results are provided in Table 1 below.

TABLE 1

| NO | Classification | IMPACT POINT | Tibia Acceleration (150 G) | Bending Angle (15 Deg) | Shear Displacement (5 mm) |
|---|---|---|---|---|---|
| 1 | G/F 60% and 70% | 0BL | 112.8 | 4.6 | 1.1 |
|   |   | 480BL | 132.4 | 5.1 | 1.4 |
| 2 | G/F 70% | 0BL | 110.8 | 4.6 | 1.1 |
|   |   | 480BL | 130.9 | 5.1 | 1.4 |

—When properties are mixed, only G value is increased by about 2 G and shear displacement and angle are not changed As illustrated in the above Table 1, it is illustrated that a case in which high stiffness and low stiffness are mixed has the tibia acceleration which is increased by about 2G as compared to a case in which high stiffness and low stiffness are not mixed and there are no significant differences. Therefore, it may be appreciated that performance stability is also guaranteed.

According to various embodiments of the present invention, the stiffener provided to satisfy the pedestrian regulations may enable cost reduction and weight lightening as compared to the existing stiffener while simultaneously satisfying both stiffness and flexibility, may increase a degree of freedom of the design, and may adjust physical flexible and an energy absorption rate according thereto.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rod stiffener, comprising:
   a rod molded by a glass fiber reinforced thermoplastic resin and including a core part and an outer part surrounding an outer circumference of the core part, and
   brackets connected to both ends of the rod,
   wherein properties of the core part forming a center of the rod and the outer part surrounding the core part are formed to be different from each other, and the properties of the core part and the outer part are differentiated by a mixing amount of glass fiber and polypropylene resin consisting of the glass fiber reinforced thermoplastic resin,
   wherein the properties of the core part and the outer part are formed so that the outer part has relatively higher stiffness than the core part.

2. The rod stiffener of claim 1, wherein the mixing amount of the glass fiber and the polypropylene resin are mixed at a weight ratio of 60 to 90:10 to 40 of the glass fiber to the polypropylene resin.

3. The rod stiffener of claim 1, wherein the brackets are integrally molded on the rod.

4. A rod stiffener, comprising:
   a rod molded by a glass fiber reinforced thermoplastic resin and including a core part and an outer part surrounding an outer circumference of the core part; and
   brackets connected to both ends of the rod,
   wherein the glass fiber reinforced thermoplastic resin includes a mixing amount of glass fiber and a mixing amount of a polypropylene resin,
   wherein properties of the core part forming a center of the rod and the outer part surrounding the core part are formed to be different from each other, and the properties of the core part and the outer part are differentiated by the mixing amount of the glass fiber and the mixing amount of the polypropylene resin,
   wherein the outer part has a relatively higher stiffness than the core part.

5. The rod stiffener of claim 4, wherein the mixing amount of the glass fiber and the polypropylene resin are mixed at a weight ratio of 60 to 90:10 to 40 of the glass fiber to the polypropylene resin.

6. The rod stiffener of claim 4, wherein the mixing amount of the glass fiber is at least 60 wt% or more.

* * * * *